United States Patent
Lai

(10) Patent No.: US 6,692,899 B2
(45) Date of Patent: Feb. 17, 2004

(54) PROCESS FOR MANUFACTURING REFLECTIVE TFT-LCD WITH ROUGH DIFFUSER

(75) Inventor: Han-Chung Lai, Chung Li (TW)

(73) Assignee: Au Optronics Corp., Hsinchu (TW)

( * ) Notice: Subject to any disclaimer, the term of this patent is extended or adjusted under 35 U.S.C. 154(b) by 44 days.

(21) Appl. No.: 09/987,973

(22) Filed: Nov. 16, 2001

(65) Prior Publication Data

US 2003/0044720 A1 Mar. 6, 2003

(30) Foreign Application Priority Data

Aug. 29, 2001 (TW) ........................................ 90121367 A

(51) Int. Cl.⁷ .................... G02F 1/136; G03C 5/56; H01L 21/339
(52) U.S. Cl. ................. 430/311; 430/313; 430/315; 430/322; 349/43; 349/46; 349/47; 349/42; 438/149
(58) Field of Search .................... 430/311, 313, 430/315, 322; 349/43, 46, 47, 42; 438/149

(56) References Cited

U.S. PATENT DOCUMENTS

| | | | |
|---|---|---|---|
| 6,433,842 B1 * | 8/2002 | Kaneko et al. | 349/43 |
| 2002/0115297 A1 * | 8/2002 | Lai | 438/694 |
| 2002/0151178 A1 * | 10/2002 | Lai | 438/694 |
| 2002/0176029 A1 * | 11/2002 | Fujino | 349/43 |

* cited by examiner

Primary Examiner—Mark F. Huff
Assistant Examiner—Daborah Chacko-Davis
(74) Attorney, Agent, or Firm—Troxell Law Office PLLC

(57) ABSTRACT

A method of forming a TFT-LCD device with a rough pixel electrode is disclosed. The method comprises the following steps. First, a first passivation layer is formed on the transparent insulator substrate to cover the transistor. The first passivation layer is etched to form contact holes therein to expose a source structure and a drain structure of the transistor. A pixel electrode is formed on the first passivation layer and filled into the contact holes to connect electrically to the drain structure. A second passivation layer is formed on the first passivation layer and the pixel electrode to cover uniformly the transistor for planarization. Then a lithography procedure is done to etch the second passivation layer to make surfaces thereof rough.

3 Claims, 5 Drawing Sheets

PROCESS FOR MANUFACTURING REFLECTIVE TFT-LCD WITH ROUGH DIFFUSER

FIELD OF THE INVENTION

The present invention relates to a process for manufacturing TFT liquid crystal displays and, more specifically, to a process for manufacturing pixel electrodes with rough surfaces for serving as the reflection members of TFT-LCD devices.

BACKGROUND OF THE INVENTION

With the advance of techniques for manufacturing thin-film transistors, the liquid crystal displays (LCD) are widely applied in electrical products, such as PDAs, laptops, cellphones, high resolution television sets, etc. due to advantages as smaller size, portability, and lower power consumption. Particularly the up-to-date reflective LCD device is usually performed by utilizing the reflection of light incident from outside, wherein the pixel electrodes made of metal materials are applied to serve as reflection members. Thus the light reflected from the pixel electrode performs desired images on the displays through liquid crystal molecules and color filters. The reflective type liquid crystal display which does not require a backlight has been vigorously developed due to the advantages such as power saving, thin and lightweight. In addition, since members for the backlight are not necessary, the cost may be reduced.

Notedly, the deeply concerned and important key point is how to promote efficiency of light reflection because the light source of the reflective type LCD comes from the external illumination. In prior art, polarizing plates are introduced to adjust the phases of incident lights for increasing reflection intensity. However, it is not practical to apply the additional polarizing plates into the reflective type LCD. Another solution is to fabricate the pixel electrodes with rough surface for serving as the reflection diffusers for completely utilizing external illuminations, promoting efficiency of reflections and increasing contrasts.

Please refer to FIG. 1, the cross-sectional view of TFT-LCD with rough reflection fabricated by prior art is shown. The related process comprises follow steps. A gate structure 12 is defined on a glass substrate 10 first. Then an insulating layer 14 is deposited on surfaces of the gate structure 12. A semiconductor layer 16 such as amorphous silicon, a doped silicon layer 18 and a metal layer are sequentially formed on the gate structure 12. Next a photolithography procedure is performed to define a drain structure 20 and a source structure 22 to fabricate a thin film transistor 24.

After the thin film transistor 24 is fabricated, an additional step is performed to form plural bumps 26 made of photoresists in the areas for defining pixel electrodes later. Next a passivation layer 28 such as polymer material is coating onto the bumps 26. And a pixel electrode 30 is formed above those layers. Thus, the reflection efficiency is promoted due to the pixel electrode 30 having a rough and uneven surface. Next another thicker passivation layer 32 is formed on the surfaces of the pixel electrode 30 and the thin film transistor 24 for the purpose of planarization.

Please refer to FIG. 2, the TFT-LCD with polarizing plates is shown. After defining the thin film transistor 24 and the pixel electrode 30, the thicker passivation layer 32 is deposited on these devices and layers for planarization. Then a liquid crystal layer (not illustrated) and a color filter 34 are sequentially formed on the passivation layer 32. A polarizing plate 36 is fabricated on the color filter 34 to increase reflection intensity. However the additional polarizing plate 36 leads to increasing cost and more complicated process.

SUMMARY OF THE INVENTION

The one objective of the present invention is to provide a method for manufacturing a TFT-LCD device having pixel electrodes with rough surfaces for serving as reflection members.

Another objective of the present invention is to provide a method of forming pixel electrodes with rough surfaces.

A method of forming a TFT-LCD device with a rough pixel electrode for serving as the diffuser member is disclosed hereinafter. The method comprises the following steps. First, a first passivation layer is formed on the transparent insulator substrate to cover the transistor. The first passivation layer is etched to form contact holes to expose a drain structure and simultaneously to define a plurality of ridge bumps in a display area on the transparent insulator substrate. Then, the ridge bumps are etched to make surfaces thereof rough. A pixel electrode is formed on the first passivation layer and the ridge bumps to connect electrically to the drain structure, wherein the pixel electrode formed along the rough surfaces of the ridge bumps has a rough diffuse surface.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

A method is disclosed hereinafter to manufacture the TFT-LCD devices with pixel electrodes that are served as diffusers. The planarization passivation layer formed on the pixel electrode is etched to make its surface rough for diffusing the incident light. Besides, the etching procedure is also applied to etch the passivation layer formed beneath the pixel electrode to form plural ridge bumps to make the pixel electrode has wave-like surfaces. The detailed description is given as following.

Figure 1:
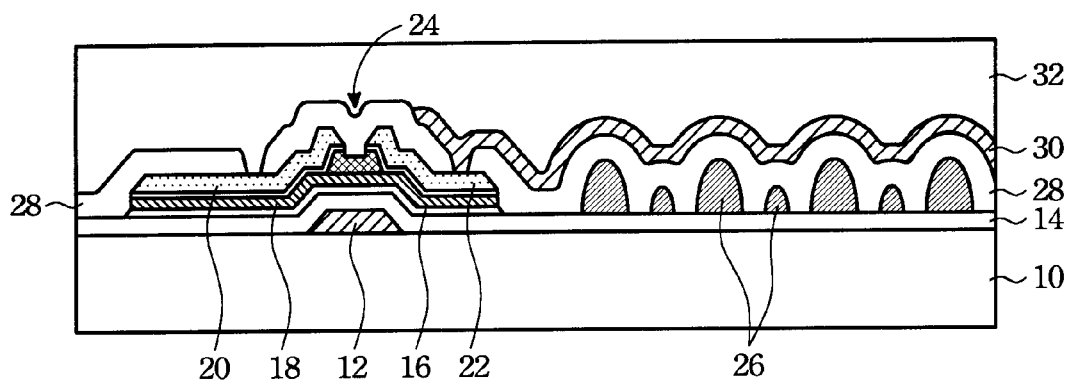
FIG. 1 is a cross sectional view of a transparent substrate illustrating the TFT-LCD device which has rough reflection members in accordance with the prior art.
Figure 2:
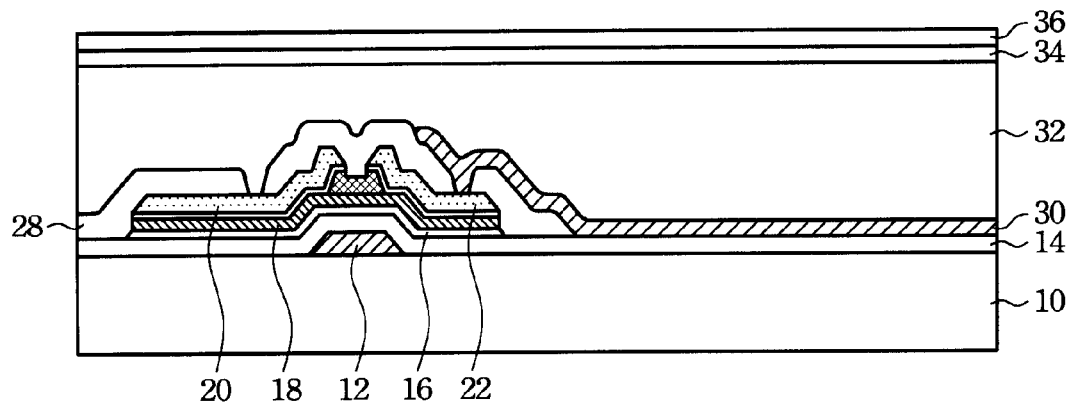
FIG. 2 is a cross sectional view of a transparent substrate illustrating the TFT-LCD device which has a polarizing plate in accordance with the prior invention.
Figure 3:
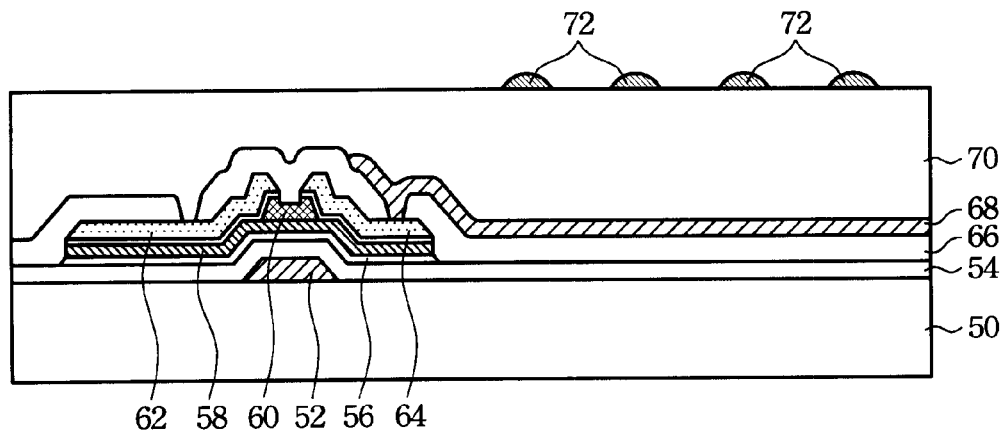
FIG. 3 is a cross sectional view of a transparent substrate illustrating the step of forming photoresist bumps on the second passivation layer in accordance with the present invention.

The First Embodiment:

Refer to FIG. 3, a thin film transistor is formed on a transparent insulator substrate 50 first. The substrate 50 is preferably made of a glass, quartz, or the likes. And the procedures to fabricate the thin film transistor are described as follows. First a gate structure 52 is defined on the transparent insulator substrate 50. In a preferred embodiment a metal layer is formed on the transparent insulator substrate 50 by performing a PVD procedure such as sputtering. And the metal layer 52 can be chosen from the group of aluminum(Al), titanium(Ti), chromium(Cr), tungsten(W), tantalum(Ta), alloy and any combination thereof. Then the etching procedure such as RIE is performed to etch the metal layer for defining the gate structure 52.

After the gate structure 52 is defined, an insulating layer 54 is deposited to cover the gate structure 52. In general, the insulating layer 54 can be chosen from the group of oxide, nitride, oxynitride, or other likes. Then a gate insulating layer 56 and a semiconductor layer 58 are deposited on the insulating layer 54 in sequence, wherein the gate insulating layer 56 is made of nitride or likes. And material such as amorphous silicon can be applied to form the semiconductor layer 58 for serving as the channels of TFT devices latter.

Next an etching stopper 60 is defined on the semiconductor layer 58 above the gate structure 52. A source structure 62 and a drain structure 64 are then defined individually on the semiconductor layer 58 and aside the etching stopper 60. In an embodiment, a doped silicon layer and a metal layer are formed in sequence on outer surfaces of the etching stopper 60 and the semiconductor layer 58. Then an etching procedure is performed to etch these layers for defining the source structure 62 and the drain structure 64. And the etching stopper 60 is introduced to prevent the semiconductor layer 58 from damage in the etching procedure later.

After defining the thin film transistor, a first passivation layer 66 is formed above the substrate 50 to cover the source structure 62, the drain structure 64 and the etching stopper 60. In a preferred embodiment, the material of the first passivation layer 66 can be chosen from a group of polymer and photosensitive materials. Next a lithography etching procedure is performed to define contact holes in the first passivation layer 66 to expose partial surfaces of the source structure 62 and the drain structure 64.

Then a pixel electrode 68 is formed on the first passivation layer 66 to electrical connect the drain structure 64. The materials with higher reflectivity, such as metal, can be introduced to form the pixel electrode 68. Notedly the pixel electrode 68 is also applied to serve as a reflection member in reflective type TFT-LCD devices. Next a second passivation layer 70 with a thicker thickness is deposited on the first passivation layer 66 and the pixel electrode 68 to cover uniformly the thin film transistor for planarization. The second passivation layer 70 is formed of the polymer or photosensitive materials like as same as the first passivation layer 66.

Figure 4A:
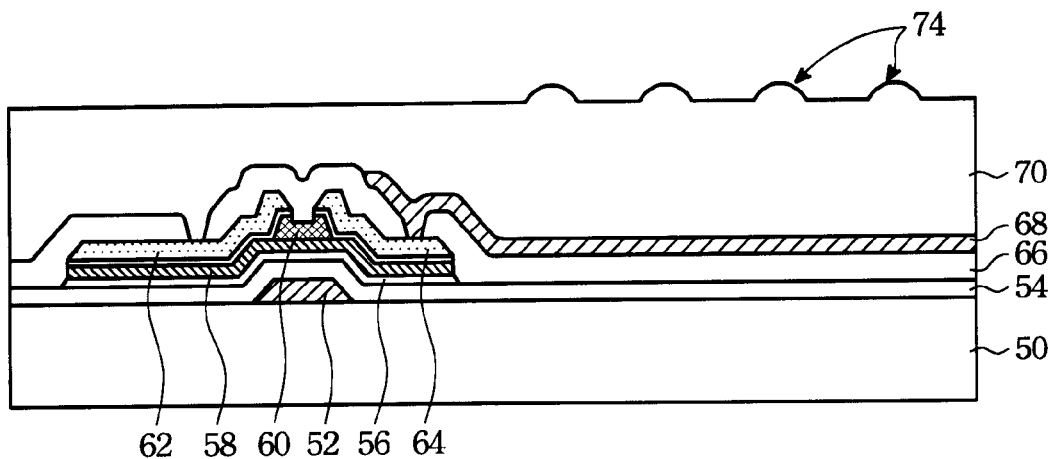
FIGS. 4A~B are cross sectional views of transparent substrates illustrating the steps of etching the second passivation layer to have rough surfaces thereon in accordance with the present invention.

Then plural photoresist bumps 72 are defined on the second passivation layer 70. In a preferred embodiment, the photoresist bumps 72 have hemi-spherical shapes. Next the photoresist bumps 72 are applied to serve as etching mask to etch the second passivation layer 70 to make multiple hemi-spherical shapes thereon. After removing the residual photoresist bumps 72, the second passivation layer 70 has rough and uneven upper surface 74 as shown in FIG. 4A. Thus the outside incident light can be diffused by the surface of the second passivation layer 70.

Figure 4B:
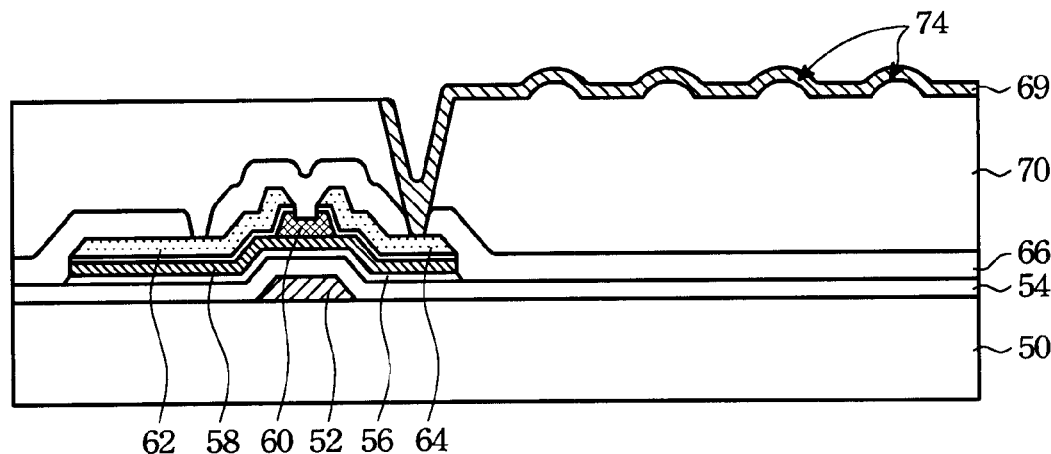
Figure 5:
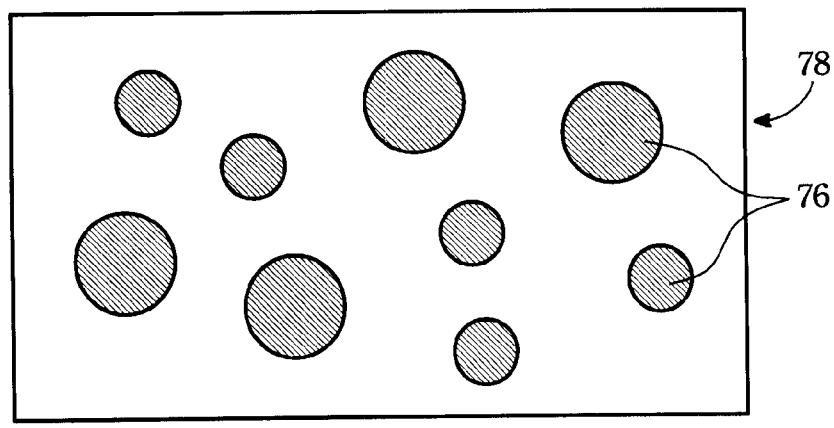
FIG. 5 is a top view of a photomask illustrating the patterns defined on the photomask for exposing the second passivation layer.
Figure 6:
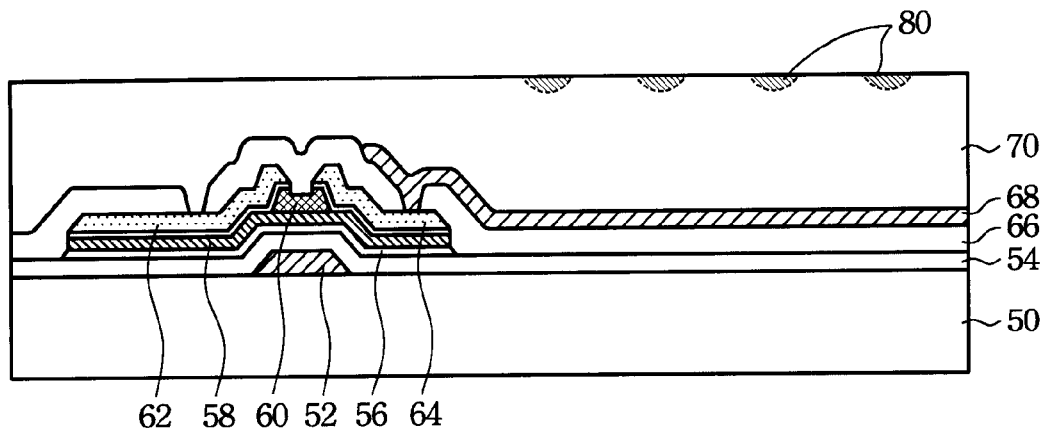
FIG. 6 is a cross sectional view of a transparent substrate illustrating the lithography steps to make the surfaces of the passivation layer rough and uneven in accordance with the present invention.

Another embodiment is illustrated in FIG. 4B. After the first passivation layer 66 is deposited on the substrate 50, the second passivation layer 70 is formed on the first passivation layer 66 directly for planarization. Then an etching step is done to etch the second passivation layer 70 and the first passivation layer 66 in sequence to form the contact hole therein. And similarly the above photolithography procedure is done to have rough and uneven upper surface 74 on the second passivation layer 70. A pixel electrode 69 is next formed on the second passivation layer 70 to electrical connect the drain structure 64. The pixel electrode 69 has rising and falling surface as shown in FIG. 4B along the rough and uneven surface 74 of the second passivation layer 70. Surely according to the required process, a single thick passivation layer can be applied to substitute for the first passivation layer 66 and the second passivation layer 70.

Figure 7:
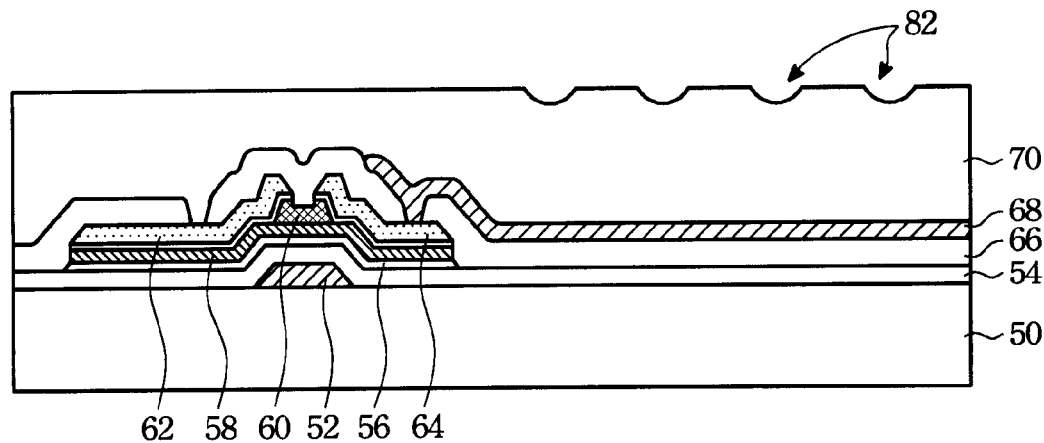
FIG. 7 is a cross sectional view of a transparent substrate illustrating the steps of making the second passivation layer has rough surfaces in accordance with the present invention.

It is noted that an exposing procedure can be introduced to make the second passivation layer 70 has the rough upper surface 74 except the above etching procedure. When the second passivation layer 70 is made of photosensitive material, the photomask 78 with multiple circular patterns 76 is applied in the exposing procedure to form exposed areas 80 on the second passivation layer 70. Then as illustrated in FIG. 7, the second passivation layer 70 is developed by developer to have rough and uneven surface 82 on the second passivation layer 70.

Figure 8:
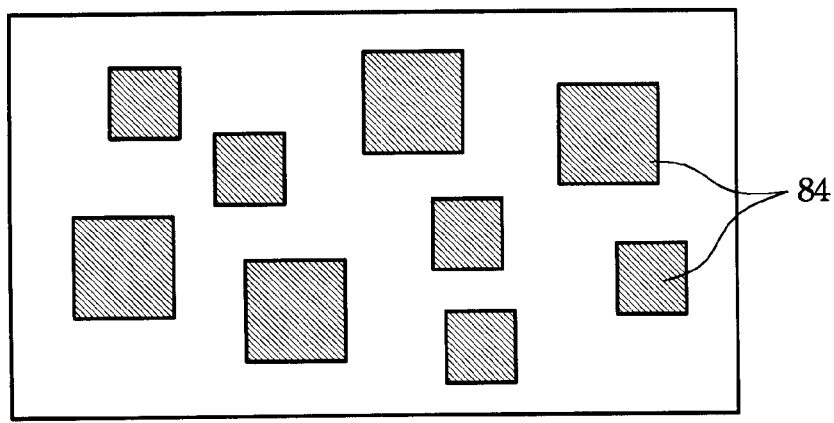
FIGS. 8~9 are top views of photomasks illustrating the patterns defined thereon in accordance with the present invention.
Figure 9:
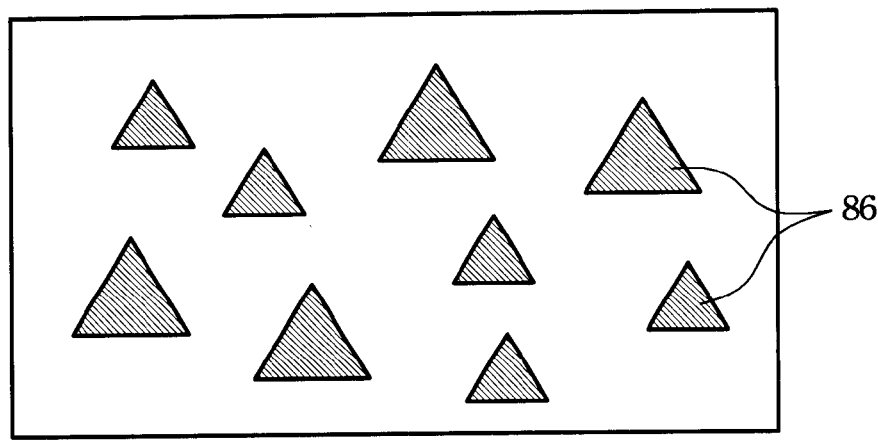

It is noted that the photomask with other kind of pattern can be introduced to expose the passivation layer 70 according to the requirements of the process. For example, square patterns 84 shown in FIG. 8 or triangle patterns 86 shown in FIG. 9 can be introduced to the exposing procedure. Surly the rough degrees and surface shapes of the passivation layer 70 can be controlled by introducing the different patterns with different shapes and dimensions.

Figure 10:
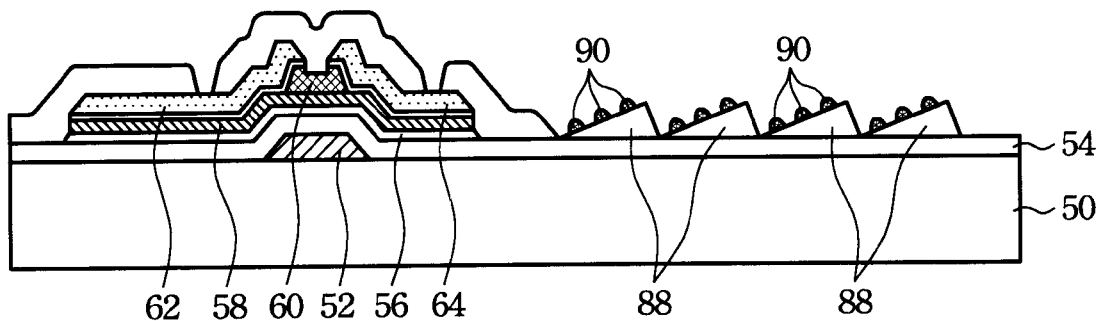
FIG. 10 is a cross sectional view of a transparent substrate illustrating the steps of forming photoresist bumps on the ridge bumps in accordance with the present invention.
Figure 11:
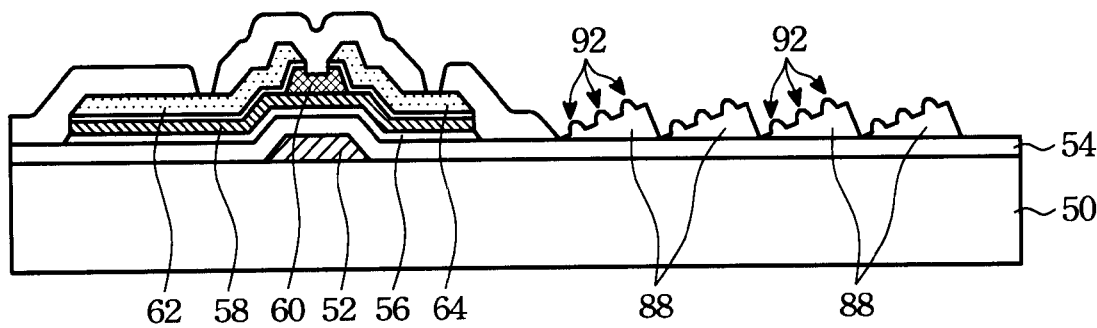
FIG. 11 is a cross sectional view of a transparent substrate illustrating the steps of defining plural ridge bumps which have rough surfaces in accordance with the present invention.

The Second Embodiment:

Except the etching procedure for the second passivation layer 70 to define the diffuse surface, another method is to etch the first passivation layer 66 to define diffusing surfaces. Refer to FIG. 10, after depositing the first passivation layer 66 on the transparent insulator substrate 50, an etching procedure is done to form contact holes in the first passivation layer 66 and simultaneously to define plural ridge bumps 88 in the pixel electrode areas. Then plural photoresist bumps 90 are defined on the ridge bumps 88. In a preferred embodiment, the photoresist bumps 90 are defined with hemi-spherical surfaces. Next the ridge bumps 88 are etched using the photoresist bumps to serve as etching masks to duplicate the hemi-spherical shapes onto the ridge bumps 88. Similarly after removing residual photoresist bumps 90, the ridge bumps 88 have rough and uneven surfaces 92, as shown in FIG. 11.

Figure 12A:
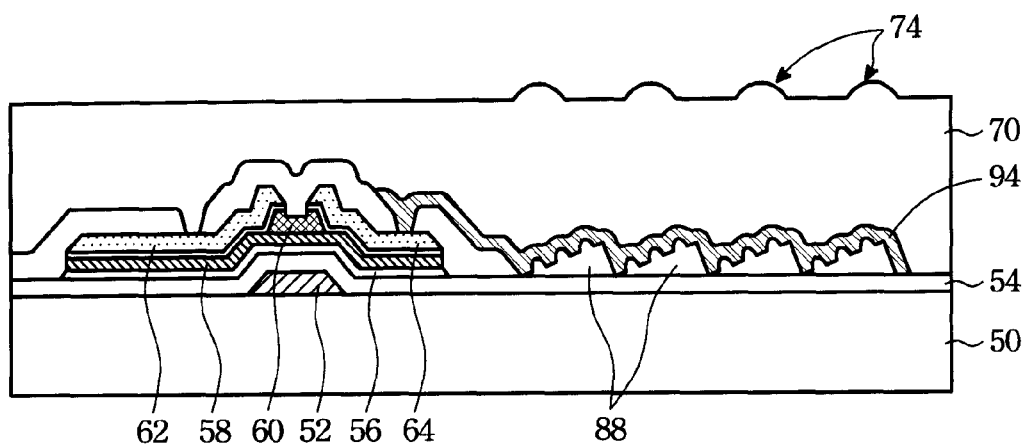
FIGS. 12A~B are cross sectional views of transparent substrates illustrating the steps of forming the second passivation layer with rough surfaces in accordance with the present invention.

The passivation layer 70 with rough surfaces as described in the first embodiment is also applied to above structures. Refer to FIG. 12A, after forming pixel electrode 94 on the ridge bumps 88 and the residual first passivation layer 66, the thicker second passivation layer 70 is formed to cover the whole thin film transistor for planarization. Then the second passivation layer 70 is etched to form rough surfaces thereon to diffuse the incident light. Thus the diffuse efficiency of incident light can be promoted by combining the rough second passivation layer 70 and the uneven pixel electrode 94.

Figure 12B:
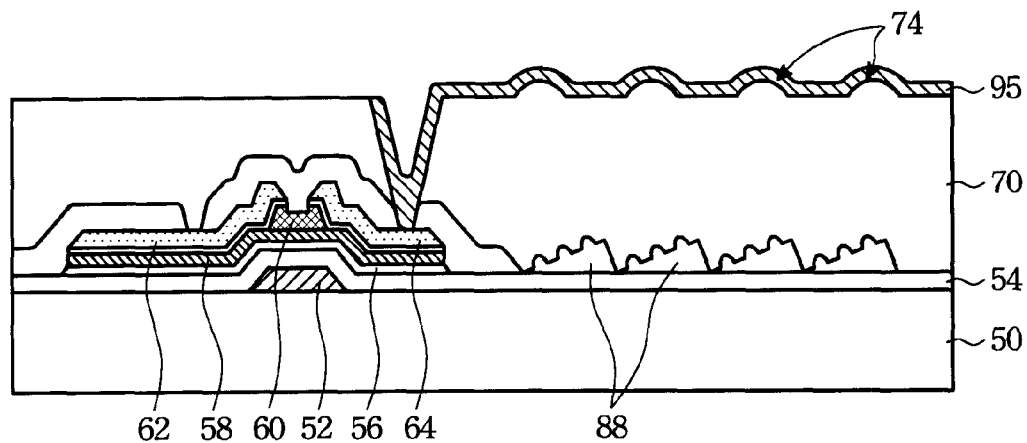

As described above, the pixel electrode can applied onto the second passivation layer 70. Please refer to FIG. 12B, after the ridge bumps 88 are defined on the insulating layer 54, the second passivation layer 70 is formed on the residual first passivation layer 66 and the ridge bumps 88. And an etching step is done to etch the second passivation layer 70 and the residual first passivation layer 66 in sequence to form the contact hole therein. Then the similar photolithography procedure is done to have rough and uneven upper surface 74 on the second passivation layer 70. A pixel electrode 95 is next formed on the second passivation layer 70 to electrical connect the drain structure 64. The pixel electrode 95 has rising and falling surfaces as shown in FIG. 12B along the rough surface 74 of the second passivation layer 70. Surely a single thick passivation layer can be applied to substitute for the first passivation layer 66 and the second passivation layer 70.

The method mentioned above is applied to the process for forming the thin-film transistors with the etching stopper. However the feature of the present invention can also be introduced to the BCE type TFT-LCD devices without the etching stopper. The difference is there is no requirement to form the etching stopper after forming the semiconductor layer. And a back channel etching step is applied to define the source/drain structures. Next the second passivation layer is deposited as illustrated in above embodiment.

Figure 13:
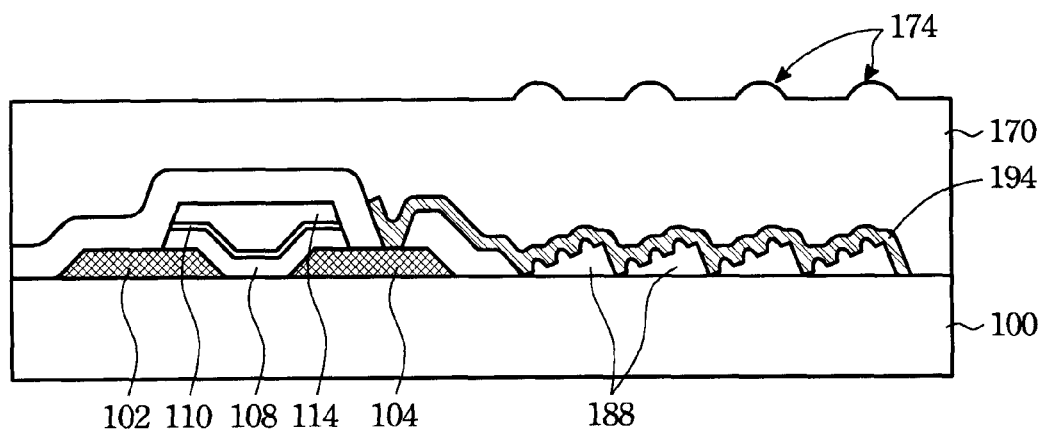
FIG. 13 is a cross sectional view of transparent substrates illustrating the steps of fabricating the TFT-LCD devices with top gate type transistors.

The present invention can also be applied to the top gate type processes. Refer to FIG. 13, a source structure 102 and a drain structure 104 are defined on a transparent insulator substrate 100. Then an amorphous silicon layer 108, a gate insulating layer 110 and a gate structure 114 are formed sequently on the source structure 102, the drain structure 104 and the transparent insulator substrate 100. The amorphous silicon layer 108 is applied to define channels of the thin film transistors. Subsequently a first passivation layer is formed to cover the transparent insulator substrate 100. An etching step is next done to define contact holes in the first passivation layer for exposing the drain structure 104 and simultaneously to define plural ridge bumps 188 in the areas where are applied to fabricate pixel electrodes later. Similarly the above etching procedures are performed to make the surfaces of the ridge bumps 188 rough and uneven.

Then a pixel electrode 194 is formed on the first passivation layer and the ridge bumps 188. The pixel electrode 194 is also filled into the contact holes to connect electrically the drain structure 104. And the deposited pixel electrode 194 has rough diffusing surface along the ridge bumps 188. Next a thick second passivation layer 170 is formed to cover uniformly the whole thin film transistor for planarization. An etching step is then performed to make the surfaces of the second passivation layer 170 rough. Thus the diffuse efficiency can be further promoted by combining the rough second passivation layer 170 and the uneven pixel electrode.

The present invention can provide various benefits. First, the diffusing efficiency is promoted because the planarization passivation layer has rough and uneven surface by performing the etching procedures. Thus there is no requirement to introduce polarizing plates on the TFT-LCD device. The cost of the process is thereby decreasing.

Besides, plural ridge bumps are defined by etching the first passivation layer to adjust the directions of the reflected lights to accumulate in predetermined angle range for the purpose of promoting contract of the LCD. And the diffusing efficiency of the pixel electrode can be promoted in advance due to the underneath ridge bumps with uneven surfaces.

As is understood by a person skilled in the art, the foregoing preferred embodiment of the present invention is illustrated of the present invention rather than limiting of the present invention. It is intended to cover various modifications and similar arrangements included within the spirit and scope of the appended claims, the scope of which should be accorded the broadest interpretation so as to encompass all such modifications and similar structure. For example, the etching stoppers are applied in the first and second embodiments of the description above to prevent the below semiconductor layer from etching damage. However the same structure and feature can also be applied to the back channel etching (BCE) type process to save one photomask for promoting the throughput in advance. And the feature can also be applied to the process for top gate type transistor as described above.

While the preferred embodiment of the invention has been illustrated and described, it will be appreciated that various changes can be made therein without departing from the spirit and scope of the invention.

What is claimed:

1. A method of forming a TFT-LCD device on a transparent insulator substrate wherein a transistor is defined on the transparent insulator substrate, the method comprising the steps of:

forming a first passivation layer on said transparent insulator substrate to cover said transistor;

etching said first passivation layer to form contact holes therein to expose a source structure and a drain structure of said transistor and to define a plurality of ridge bumps in a pixel electrode area on said transparent insulator substrate simultaneously, each ridge bump having a large inclined plane and a small inclined plane, forming a plurality of first hemi-spherical photoresist bumps on said large inclined plane of each of said ridge bumps;

etching said ridge bumps by using said first hemi-spherical photoresist bumps as etching masks to make said large inclined plane of each said ridge bump rough;

forming a pixel electrode on said first passivation layer, wherein said pixel electrode is filled into said contact holes to connect electrically to said drain structure;

depositing a second passivation layer on said first passivation layer and said pixel electrode to cover uniformly said transistor for planarization;

forming a plurality of second hemi-spherical photoresist bumps on said second passivation layer; and etching said second passivation layer by using said second hemi-spherical photoresist bumps as etching masks to make surfaces thereof rough.

2. A method of forming a TFT-LCD device with diffuse pixel electrodes on a transparent insulator substrate which has a transistor formed thereon, the method comprising the steps of:

forming a first passivation layer on said transparent insulator substrate to cover said transistor;

etching said first passivation layer to form contact holes to expose a drain structure and simultaneously to define a plurality of ridge bumps in a display area on said transparent insulator substrate, each ridge bump having a large inclined plane and a small inclined plane;

forming a plurality of photoresist bumps on said large inclined plane of each ridge bump;

etching said ridge bumps by using said photoresist bumps as etching masks to make said large inclined plane of each ridge bump rough; and forming a pixel electrode on said first passivation layer and said ridge bumps to connect electrically to said drain structure, wherein said pixel electrode formed along said rough surfaces of said ridge bumps has a rough diffusing surface;

depositing a second passivation layer on said first passivation layer and said pixel electrode to cover said transistor uniformly for planarization after forming said pixel electrode;

applying a photomask with multiple selected patterns to expose said second passivation layer. wherein said multiple selected patterns have at least two sizes; and developing said second passivation layer to make surfaces thereof rough.

3. The method of claim 2, wherein said selected patterns are chosen from the group of patterns consisting of circles, squares, and triangles.

* * * * *